Oct. 21, 1952     C. R. STODDARD, JR     2,614,357
PORTABLE BAIT CONTAINER
Filed Nov. 23, 1948
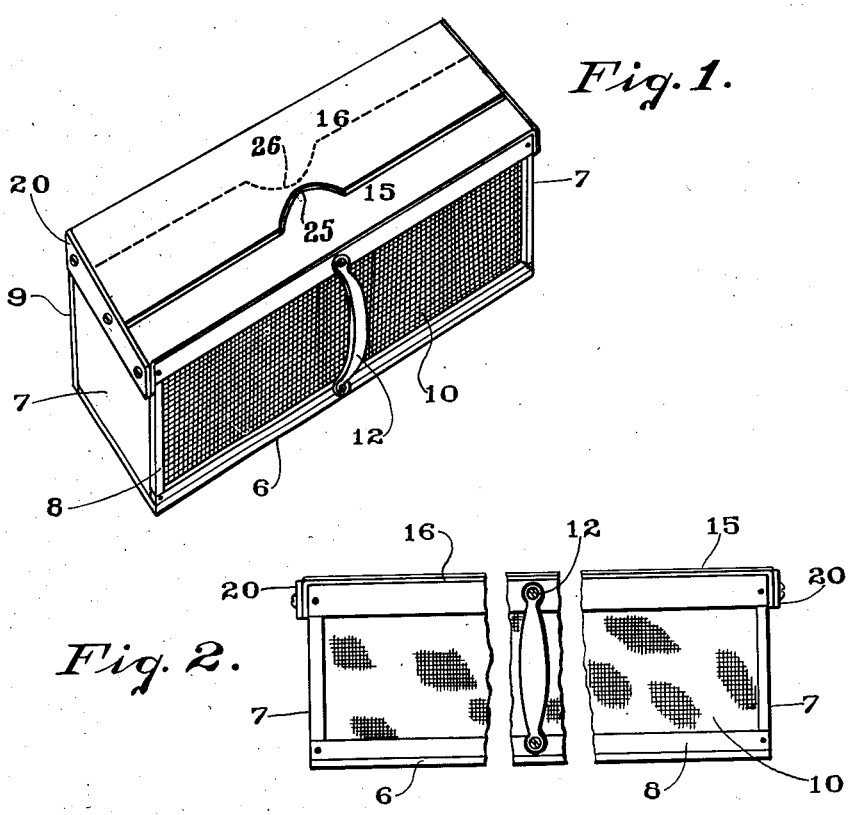
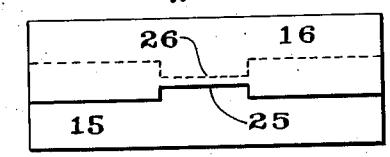
INVENTOR.
CHARLES R. STODDARD JR.
BY Clifford C. Bradbury
ATTORNEY Patented Oct. 21, 1952

2,614,357

UNITED STATES PATENT OFFICE 2,614,357

PORTABLE BAIT CONTAINER

Charles R. Stoddard, Jr., Richmond, Ind.

Application November 23, 1948, Serial No. 61,598

1 Claim. (Cl. 43—55)

This invention relates to a portable bait container for live bait, such as frogs, crickets, grasshoppers or other quick moving creatures.

The object of the invention is to construct a container for this purpose into which the hand can be inserted for selection and withdrawal of the desired bait without danger of the escape of any of the remaining creatures.

According to the general features of this invention, I provide a container with a multi-piece covering of flexible material which will yield to permit the insertion of the hand and wrist, and will draw together around the wrist to substantially close the opening against escape by any of the contents.

A form of cover suitable for this purpose may comprise tensioned rubber strips secured at their ends to opposite walls of the container in such relation that their adjacent edges are overlapped for a substantial portion of the width of each strip. The overlapping edges are each provided with a notch less in depth than the width of the strip. By making the overlapping portions of the strip. By making the overlapping portions of these notches substantially the size of the wrist, the edges of the closure may be made to conform to and snugly fit the wrist, and combine with the overlapping portions upon each side of the wrist to completely close the cover against escape of the contents.

In the drawings,

Fig. 1 is a perspective view of the bait container embodying my invention.

Fig. 2 is a view in front elevation.

Fig. 3 illustrates a modification of the elastic closures for the container.

Referring to the drawings, the bait container comprises a bottom wall 6, end walls 7, and front and back walls 8 and 9. The front wall 8 is paneled with a screen 10 to provide ventilation for the carrier, and a window for viewing the contents. Secured to the front wall is a carrying handle 12.

Elastic strips 15 and 16 are slightly narrowed at 25 and 26 and are secured across the top portion of the box to provide a closure for insertion and withdrawal of the hand. These strips are formed of rubber approximately the weight of that used in inner tubes of automobile tires. The strips 15 and 16 are tensioned across the top portion of the container, and their ends are secured to the faces of the end walls 7 by means of screw fastened clamping strips 20.

The strips 15 and 16 are of sufficient width to completely cover the top portion of the box with the ends of their adjacent edges overlapping for approximately half the width of the strips. This overlapping relation of the strips is an important factor in the successful use of the container from the standpoint of escape of the bait creatures.

In securing bait from the box, the hand of the user will be inserted between the overlapping edges of the strips 15 and 16 by a downward movement. The greater the margin of overlap, the less will be the length of the lateral separation of the adjacent edges of the strips 15 and 16 adjacent the wrist, thus resulting in less likelihood of the bait escaping. Since expediency requires that the container be limited to size, and that the overlap of the strips be limited for easy insertion of the hand, the openings upon each side of the wrist may not be completely closed, although they can be reduced to a size which will substantially reduce the loss of bait in the use of the carrier.

In the modification shown in Fig. 3, the strips 15 and 16 are provided on their inner margins with rectangular cut-out portions 25 and 26, which together form an opening substantially the size of the wrist when the hand is inserted between the strips 15 and 16 for selection of a bait. With this arrangement, and with the adjacent edges of the strips beyond the opposite corners of the cutaway portions overlapping for substantially half the width of the strips, the distortion of the strips when the hand is so inserted will not be sufficient to produce any appreciable lateral separation of the overlapping edges, and since the cutaway portions will conform substantially to the contour of the wrist, all escape exits will be effectively blocked.

In the use of either of the forms of my invention, the fisherman can move his wrist lengthwise or crosswise of the container to reach bait in any part.

By my invention I have provided an easily transportable lightweight structure capable of preserving the bait in the best condition for use and in a manner convenient for the use of the fisherman with loss by escape practically eliminated.

Although I have shown and described my invention with respect to certain details of construction, it is to be understood that I do not wish to be unduly limited thereto, certain variations from the disclosure being possible without departing from the spirit or scope of my invention.

I claim:

In a bait container, a closure located on one side of the container for permitting insertion of the hand into the container, said closure comprising a pair of elastic strips secured longitudinally across the box with adjacent edges in overlapping relation, said strips being provided in their adjacent edges with oppositely disposed cutaway portions approximately midway of their ends.

CHARLES R. STODDARD, JR.

REFERENCES CITED

The following references are of record in the file of this patent:

UNITED STATES PATENTS

| Number | Name | Date |
|---|---|---|
| 617,017 | Harrison | Jan. 3, 1899 |
| 656,655 | McCurdy | Aug. 28, 1900 |
| 1,140,625 | Spitzler | May 25, 1915 |
| 1,208,586 | Leachman | Dec. 12, 1916 |